(12) United States Patent
Joye

(10) Patent No.: US 8,582,758 B2
(45) Date of Patent: Nov. 12, 2013

(54) APPARATUS AND A METHOD FOR CALCULATING A MULTIPLE OF A POINT AN ELLIPTIC CURVE

(75) Inventor: Marc Joye, Cesson Sevigne (FR)

(73) Assignee: Thomson Licensing, Issy-les-Moulineaux (FR)

( * ) Notice: Subject to any disclaimer, the term of this patent is extended or adjusted under 35 U.S.C. 154(b) by 427 days.

(21) Appl. No.: 12/735,757

(22) PCT Filed: Feb. 12, 2009

(86) PCT No.: PCT/EP2009/051657
§ 371 (c)(1),
(2), (4) Date: Aug. 13, 2010

(87) PCT Pub. No.: WO2009/101147
PCT Pub. Date: Aug. 20, 2009

(65) Prior Publication Data
US 2010/0310066 A1  Dec. 9, 2010

(30) Foreign Application Priority Data
Feb. 15, 2008  (EP) ..................... 08300097

(51) Int. Cl.
*H04K 1/00* (2006.01)
*H04L 9/28* (2006.01)
*H04L 9/08* (2006.01)
*H04L 9/06* (2006.01)

(52) U.S. Cl.
CPC ............... *H04L 9/0861* (2013.01); *H04L 9/06* (2013.01); *H04L 9/28* (2013.01)
USPC .......................................................... 380/28

(58) Field of Classification Search
USPC ..................................................... 380/28, 59
See application file for complete search history.

(56) References Cited

PUBLICATIONS

Henri Cohen, Atsuko Miyaji, and Takatoshi Ono. "Efficient Elliptic Curve Exponentiation Using Mixed Coordinates". ASIACRYPT'98, LNCS 1514, pp. 51-65, 1998. Springer-Verlag Berlin Heidelberg 1998.*
Hankerson et al. "Guide to Elliptic Curve Cryptography". Springer-Verlag New York, Inc. 2004. ISBN: 0-387-95273-X.*
Ugus et al. "Optimized Implementation of Elliptic Curve Based Additive Homomorphic Encryption for WSNs". <http://www.vlsi.informatik.tu-darmstadt.de/staff/laue/publications/wess07_slides.pdf>. Published: Oct. 4, 2007.*
Gollmann et al. "Smart Card Research and Advanced Application". 9th IFIP WG 8.8/11.2 International Conference. CARDIS 2010. Passau, Germany, Apr. 14-16, 2010. ISBN-13: 978-3-642-12509-6. Springer Berlin Heidelberg New York.*

(Continued)

*Primary Examiner* — Matthew Henning
*Assistant Examiner* — Kevin Bechtel
(74) *Attorney, Agent, or Firm* — Myers Wolin LLC

(57) ABSTRACT

A device and a method for calculating a multiple of a point on an elliptic curve from the right to the left by repeated point doubling and point addition. Each point doubling is evaluated with an extended set of coordinates and each point addition is evaluated by taking as input a restricted set of the extended set of coordinates. The at least one coordinate of the extended set that is not part of the restricted set is stored in a memory between each iteration of the point doubling. This can enable speeding up the calculations as compared to prior art solutions. Also provided is a computer program product.

7 Claims, 1 Drawing Sheet

(56) References Cited

PUBLICATIONS

Ananyi, Kendall. "Design of a Reconfigurable Processor for Elliptic Curve Cryptography over NIST Prime Fields". Thesis, University of Benin. URL: <http://citeseerx.ist.psu.edu/viewdoc/download-?doi=10.1.1.95.1321&rep=rep1&type=pdf>. Published: 2006.*

Ananyi, "Design of a Reconfigurable Processor for Elliptic Curve Cryptography over NIST Prime Fields", Thesis University of Benin, Nigeria, 2006. Parts 1 and 2.

Bernstein et al., "Faster Addition and Doubling on Elliptic Curves", ASIACRYPT 2007, vol. 4833, Dec. 2, 2007, pp. 29-50.

Cohen et al., "Efficient Elliptic Curve Exponentiation Using Mixed Coordinates", ASIACRYPT '98, vol. 1514, Oct. 18, 1998, pp. 51-65.

Morain et al., "Speeding up the Computation on an Elliptic Curve Using Addition-Subtraction Chains", Informatique Theorique Et Applications—Theoretical Informatics and Applications, vol. 24, n' 6, 1990, p. 531-544.

Search Report Dated Apr. 21, 2009.

* cited by examiner

APPARATUS AND A METHOD FOR CALCULATING A MULTIPLE OF A POINT AN ELLIPTIC CURVE

This application claims the benefit, under 35 U.S.C. §365 of International Application PCT/EP2009/051657, filed Feb. 12, 2009, which was published in accordance with PCT Article 21(2) on Aug. 20, 2009 in English and which claims the benefit of European patent application No. 08300097.6, filed on Feb. 15, 2008.

FIELD OF THE INVENTION

The present invention relates generally to cryptography, and more specifically, to right-to-left scalar multiplication for elliptic curve cryptosystems.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Elliptic curve cryptography (ECC) is becoming more and more widespread, owing to, among other things, a key length that is significantly shorter than a Rivest-Shamir-Adleman (RSA) key for a corresponding security level. However, shorter key length is not the only factor to consider when choosing a cryptosystem; for example computation time must also be considered, as a relatively long wait may prove irritating to a user that uses a cryptographic system.

While elliptic curve cryptography may be used in practically any situation, it is particularly suitable for use in embedded devices as ECC requires less memory and computing capabilities than RSA-based cryptography.

The basic operation for elliptic curve cryptography is the scalar multiplication: given a point P on an elliptic curve and a scalar d, one has to compute point Q=dP (that is, P+P+ . . . +P, d times). There exist two main families of scalar multiplication methods, depending on in which direction the scalar d is scanned:
- left-to-right methods, and
- right-to-left methods.

Left-to-right methods are often used as they give rise to better performance, but they are also known to offer a lower security level.

Up until now, the skilled person has, to a certain extent, been forced to choose between performance and security. It can thus be appreciated that there is a need for a solution that overcomes at least some of the problems of the prior art. The present invention provides a solution that speeds up prior art right-to-left scalar multiplication so that the difference in performance between the two families decreases.

The classical prior art right-to-left based scalar multiplication methods will now be described.

Let E denote an elliptic curve over a field K of characteristic≠2, 3. Such an elliptic curve can be given by a Weierstrass equation:

$$E_{/K}: Y^2 = X^3 + aXZ^4 + bZ^6.$$

The set of points (X, Y, Z) on the elliptic curve forms an abelian group where the neutral element, called the point at infinity, is O=(1, 1, 0). The projective point (X, Y, Z) corresponds to O if Z=0 and to the affine point $(X/Z^2, Y/Z^3)$ otherwise. Note that the projective coordinates of a projective point are not unique because $(X, Y, Z) = (t^2 X, t^3 Y, tZ)$ for every nonzero t in K.

The classical prior art right-to-left binary scalar multiplication method takes as input a scalar d≥0 and a point P=(X, Y, Z) on an elliptic curve E with parameters a and b, and outputs the point Q=dP.
Input: d, P=(X, Y, Z)
Output: dP=(X*, Y*, Z*)
Method:
1. If d=0 or Z=0 then return (1, 1, 0) and stop.
2. Set (X*, Y*, Z*)←(1, 1, 0) and $(T_1, T_2, T_3)$←(X, Y, Z)
3. While (d≥1) do
   a. If (d is odd) then
      i. d←d−1
      ii. (X*, Y*, Z*)←Add[(X*, Y*, Z*), $(T_1, T_2, T_3)$]
   b. d←d/2
   c. $(T_1, T_2, T_3)$←Double[$(T_1, T_2, T_3)$]
4. Return (X*, Y*, Z*)

The classical prior art NAF (Non-Adjacent Form)-based scalar multiplication method takes as input a scalar d≥0 and a point P=(X, Y, Z) on an elliptic curve E with parameters a and b, and outputs the point Q=dP.
Input: d, P=(X, Y, Z)
Output: dP=(X*, Y*, Z*)
Method:
1. If d=0 or Z=0 then return (1, 1, 0) and stop.
2. Set (X*, Y*, Z*)←(1, 1, 0) and $(T_1, T_2, T_3)$←(X, Y, Z)
3. While (d≥1) do
   a. If (d is odd) then
      i. u←2−(d mod 4)
      ii. d←d−u
      iii. if (u=1) then (X*, Y*, Z*)←Add[(X*, Y*, Z*), $(T_1, T_2, T_3)$]
      iv. if (u=−1) then (X*, Y*, Z*)←Add[(X*, Y*, Z*), $(T_1, -T_2, T_3)$]
   b. d←d/2
   c. $(T_1, T_2, T_3)$←Double[$(T_1, T_2, T_3)$]
4. Return (X*, Y*, Z*)

SUMMARY OF THE INVENTION

In a first aspect, the invention is directed to a method for calculating a multiple of a point on an elliptic curve from the right to the left by repeated point addition and point doubling. Each point doubling is evaluated with an extended set of coordinates and each point addition is evaluated by taking as input a restricted set of the extended set of coordinates.

In a first preferred embodiment, output coordinates of a point doubling is used as input coordinates for the next point doubling.

In a second preferred embodiment, the elliptic curve is given by a Weierstrass equation $E_{/K}: Y^2 = X^3 + a X Z^4 + bZ^6$, with a characteristic different from 2 and 3, where a and b are a first and a second parameter of the elliptic curve.

It is advantageous that the point doubling is calculated by obtaining the values of coordinates $T_1, T_2, T_3$ and, the value of the additional coordinate, $T_4$, initialized to $T_4 = aT_3^4$, where a is the first parameter of the elliptic curve; calculating intermediate variables $U = T_1^2$, $V = T_2^2$, $M = 3U + T_4$, $W = V^2$, and $S = 2((T_1 + V)^2 - U - W)$; calculating new values of $T_3$ and $T_4$: $T_3 = 2T_2T_3$, $T_4 = 16WT_4$; calculating a new value of $T_1$: $T_1 = M^2 - 2S$; calculating a new value of $T_2$: $T_2 = M(S-T_1) - 8W$; and outputting at least the values of coordinates $T_1, T_2, T_3$ and $T_4$.

In a third preferred embodiment, the scalar multiplication is performed using a Non-Adjacent Form of the scalar.

In a fourth preferred embodiment, the scalar multiplication is performed using a binary representation of the scalar.

In a fifth preferred embodiment, the point doubling is performed using modified Jacobian coordinates and the point addition is performed using Jacobian coordinates.

In a second aspect, the invention is directed to a device for calculating a multiple of a point on an elliptic curve from the right to the left. The device comprises a processor adapted for point doubling and point addition. The processor is adapted to evaluate each point doubling using an extended set of coordinates and to evaluate each point addition by taking as input a restricted set of the extended set of coordinates.

In a third aspect, the invention is directed to a computer program that, when executed on a processor, performs a method for calculating a multiple of a point on an elliptic curve from the right to the left by repeated point doubling and point addition characterized in that each point doubling is evaluated with an extended set of coordinates and each point addition is evaluated by taking as input a restricted set of the extended set of coordinates.

In a fourth aspect, the invention is directed to a computer program product storing a computer program that, when executed on a processor, performs a method for calculating a multiple of a point on an elliptic curve from the right to the left by repeated point doubling and point addition characterized in that each point doubling is evaluated with an extended set of coordinates and each point addition is evaluated by taking as input a restricted set of the extended set of coordinates.

BRIEF DESCRIPTION OF THE DRAWINGS

Preferred features of the present invention will now be described, by way of non-limiting example, with reference to the accompanying drawings, in which.

PREFERRED EMBODIMENT OF THE INVENTION

Figure 1:
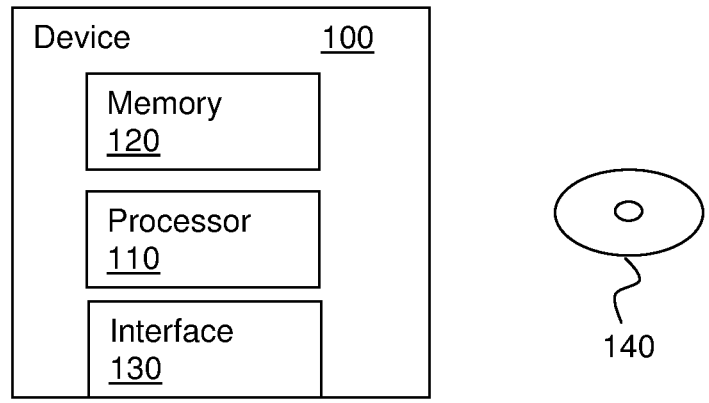
FIG. 1 illustrates a device for calculations on an elliptic curve according to a preferred embodiment of the invention.

FIG. 1 illustrates a device 100 for calculations on an elliptic curve, in particular for performing point doubling and scalar multiplication according to a preferred embodiment of the invention. The device 100 comprises at least one processor 110 (hereinafter "processor") adapted to execute a computer program that performs the calculations of the method described hereinafter. It should be noted that the processor 110 may also be implemented in hardware, or a combination of software and hardware. The device 100 further comprises a memory 120 adapted to store data, such as for example intermediate calculation results from the processor 110. The device 100 also comprises at least one interface 130 (hereinafter "interface") for interaction with other devices (not shown). FIG. 1 further illustrates a computer program product 140, such as for example a CD-ROM, storing a computer program that, when executed by the processor 110 performs scalar multiplication according to a preferred embodiment of the method of the invention.

The main idea of the invention is to use an additional coordinate $T_4$ which is used to cache a value involved in the regular point doubling operation in a right-to-left scalar multiplication method. Between iterations, the additional coordinate $T_4$ is stored in the memory 120. As the doubling in Step 3.c of the prior art methods is performed repeatedly and not modified elsewhere in the method, the caching makes it possible to speed up the method, although this is achieved at the expense of the use of extra memory space. The present invention thus intends to find a good trade-off between speed, i.e. the number of operations (in particular multiplications) performed, and use of resources (in particular memory).

Figure 2:
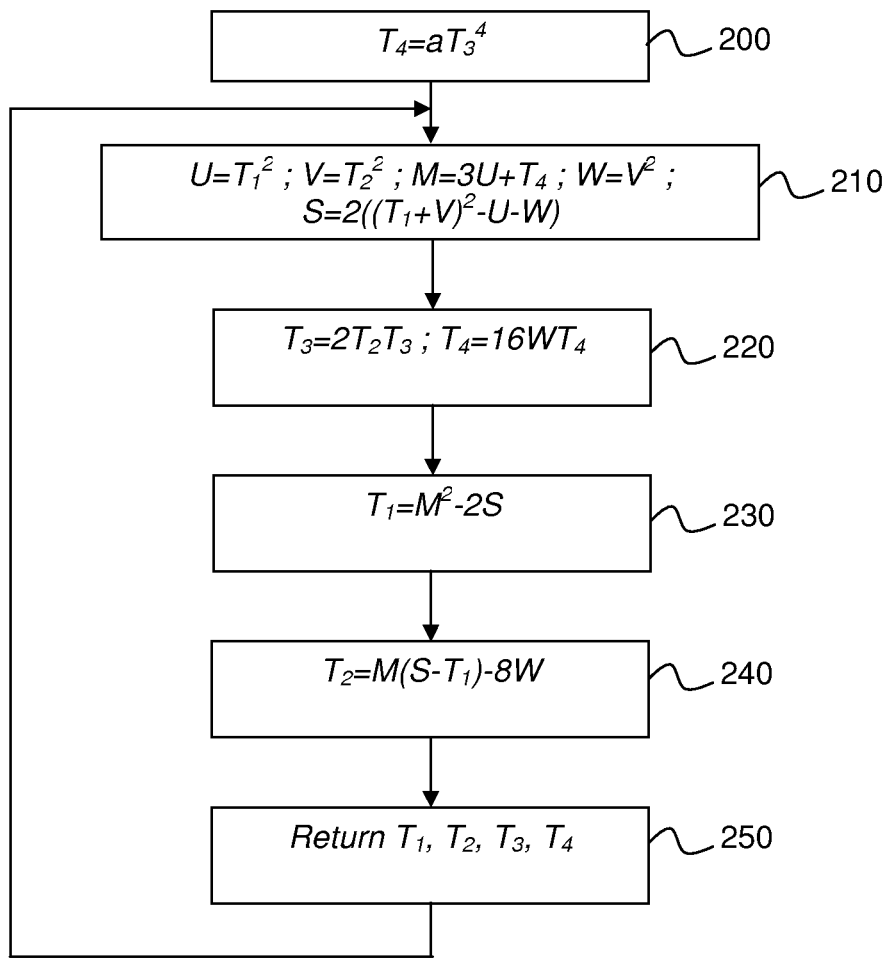
FIG. 2 illustrates a point doubling method according to a preferred embodiment of the invention.

FIG. 2 illustrates the point doubling method according to a preferred embodiment of the invention. The method advantageously replaces the doubling step 3.c in the prior art method. The input to the method is the values $T_1$, $T_2$, $T_3$, and $T_4$, where $T_4$ is initialized as $aT_3^4$ (step 200) in the first iteration of the method. A number of helpful intermediate variables are then defined, step 210:

$$U=T_1^2$$

$$V=T_2^2$$

$$M=3U+T_4$$

$$W=V^2$$

$$S=2((T_1+V)^2-U-W)$$

Then, in step 220, new values of $T_3$ and $T_4$ are calculated:

$$T_3=2T_2T_3$$

$$T_4=16WT_4$$

The value of $T_4$ is, as already mentioned, advantageously stored in the memory until it is needed in the next iteration.

In step 230, new value of $T_1$ is calculated:

$$T_1=M^2-2S$$

Finally, in step 240, the remaining new value of variable $T_2$ is calculated:

$$T_2=M(S-T_1)-8W$$

Now that the four output variables represent a point that has been doubled, they may be output in step 250 for further calculations in the other steps in the scalar multiplication method. If necessary, steps 210-250 are repeated for further iterations of the scalar multiplication method. It will be appreciated that it is not necessary to output the value of $T_4$, as this value is used only for the point doubling; this is provided that its value is stored in a memory until the next iteration of the point doubling.

An advantage of the method of the invention is that it can allow improved performance, in particular when it comes to calculation speed.

Table 1 gives the costs for point doubling for various systems and Table 2 gives their cost for point addition. The tables are based on D. J. Bernstein and T. Lange: "Faster addition and doubling on elliptic curves" In: Advances in Cryptology—ASIACRYPT 2007, LNCS, pp. 29-50, Springer-Verlag, 2007. The symbols M, S, c respectively stand for "multiplication", "squaring" and "multiplication by a constant". The two last columns give the number of multiplications when $S=\alpha M$ and $c=\beta m$ for $(\alpha, \beta)=(1, 1)$ and $(\alpha, \beta)=(0.8, 0)$.

TABLE 1

| Cost for point doubling | | | |
|---|---|---|---|
| System | Cost | (1, 1) | (0.8, 0) |
| Homogeneous ($a = -3$) | 5M + 6S + 1c (7M + 3S) | 12M (10M) | 9.8M (9.4M) |

TABLE 1-continued

Cost for point doubling

| System | Cost | (1, 1) | (0.8, 0) |
|---|---|---|---|
| Jacobian | 1M + 8S + 1c | 10M | 7.4M |
| (a = −3) | (3M + 5S) | (8M) | (7M) |
| Modified Jacobian | 3M + 5S | 8M | 7M |
| Chudnovsky | 2M + 8S + 1c | 11M | 8.4M |

TABLE 2

Cost for point addition

| System | Cost | (1, 1) | (0.8, 0) |
|---|---|---|---|
| Homogeneous | 12M + 2S | 14M | 13.6M |
| Jacobian | 11M + 5S | 16M | 15M |
| Modified Jacobian | 11M + 7S + 1c | 19M | 16.6M |
| Chudnovsky | 10M + 4S | 14M | 13.2M |

We can see that the best overall performance is obtained when using Jacobian projective coordinates for the point representation. Let l denote the bit-length of d. In this case, if Q=dP is evaluated with the classical NAF-based right-to-left binary scalar multiplication method then the expected number of operations is about $l(1M+8S+1c)+l/3(11M+5S)$ which equals 15.3 lM, if we assume S=c=M.

The method according to the invention, however, may add points using one type of coordinates and double points using another type coordinates. For example, point additions can be done using Jacobian coordinates and point doublings using modified Jacobian coordinates. This has previously been inefficient or even impossible with the left-to-right scalar multiplication methods. All these methods have in common the use of an accumulator that is repeatedly doubled and to which the input point or a multiple thereof is repeatedly added. This implies that output representation for the point doubling and point addition routines must be the same, namely the coordinate system of the accumulator.

The cost of the method according to the invention is thus about $l(3M+5S)+l/3(11M+5S)$ which equals 13.3 lM under the same assumption that S=c=M. Hence, the gain is a speed-up factor of 13.3%.

While it is possible to speed up the classical method at the cost of further memory requirements through the use of additional temporary variables, the method according to the invention is still quicker, as the speeded-up classical method evaluates Q=dP with about $l(3M+5S)+l/3(11M+7S+1c)$ which equals 14.3 lM. Therefore, the method according to the invention is still faster.

Scalar multiplication on elliptic curves is usually carried out with scalar d represented with its non-adjacent form (NAF) since the inverse of a point can easily be deduced and does not require additional memory requirements. Because the NAF is computed from the right to left, there is no need in right-to-left scalar multiplication, including the method according to the preferred embodiment of the invention, to first compute it and next to evaluate the scalar multiplication as is done in the left-to-right scalar multiplication methods. The representation can be computed on-the-fly, without having to compute and to store the NAF representation in advance.

The point at infinity may need a special treatment. For left-to-right methods, this implies that leading zeros should be skipped. There are no such complications with right-to-left scalar multiplication, including the method according to the preferred embodiment of the invention, as scalar d is processed from the right to the left.

Another advantage of the method according to the invention is that no curve parameter is involved in the doubling. This can allow hard-coding of the method, which is particularly useful for hardware implementations.

As opposed to left-to-right scalar multiplication methods, right-to-left scalar multiplication methods, including the one of the preferred embodiment of the invention, are resistant to doubling attacks. These attacks are very powerful as, from two power curves, the secret information may be fully recovered.

Furthermore, the method of the invention can be combined with a variety of randomization techniques. In particular, using the classical DPA (Differential Power Analysis) countermeasures (namely, randomized point representation or randomized isomorphic curve representation), there is no efficiency penalty.

Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A cryptographic method for calculating a multiple of a point on an elliptic curve from the right to the left by repeated point addition and point doubling in an elliptic curve cryptosystem, the method comprising:

evaluating each point doubling by a micro-processor by taking as input a set of coordinates comprising projective coordinates $T_1$, $T_2$, $T_3$ and at least one further coordinate $T_4$;

evaluating each point addition by the micro-processor by taking as input the projective coordinates $T_1$, $T_2$, $T_3$; and storing by the micro-processor the at least one further coordinate $T_4$ in a memory device for use in the next point doubling, wherein output coordinates of a point doubling is used as input coordinates for the next point doubling, wherein the point doubling is calculated by:

obtaining the values of the projective coordinates $T_1$, $T_2$, $T_3$ and the value of the further coordinate, $T_4$, initialized to $T_4 = aT_3^4$, where a is a first parameter of the elliptic curve;

calculating intermediate variables:

$U = T_1^2$;

$V = T_2^2$;

$M = 3U + T_4$;

$W = V^2$; and $S = 2((T_1+V)^2 - U - W)$;

$T_1 = M^2 - 2S$;

calculating new value of $T_2$;

$T_2 = M(S - T_1) - 8W$; and outputting at least the values of coordinates $T_1, T_2, T_3$.

2. The method of claim 1, wherein the elliptic curve is given by a Weierstrass equation $E_{JK}: Y^2 = X^3 + aXZ^4 + bZ^6$, with a characteristic different from 2 and 3, wherein b is a second parameter of the elliptic curve.

3. The method of claim 1, wherein the scalar multiplication is performed using a Non-Adjacent Form of the scalar.

4. The method of claim 1, wherein the scalar multiplication is performed using a binary representation of the scalar.

5. The method of claim 1, wherein the point doubling is performed using modified Jacobian coordinates and the point addition is performed using Jacobian coordinates.

6. A device for calculating a multiple of a point on an elliptic curve from the right to the left in an elliptic curve cryptosystem, the device comprising memory and a micro-processor configured to:
   perform repeated point doubling and point addition;
   evaluate each point doubling by taking as input a set of coordinates comprising projective coordinates $T_1, T_2, T_3$ and at least one further coordinate $T_4$;
   evaluate each point addition by taking as input the set of projective coordinates $T_1, T_2, T_3$; and
   store the at least one further coordinate $T_4$ in the memory for use in the next point doubling,
   wherein output coordinates of a point doubling is used as input coordinates for the next point doubling,
   wherein the point doubling is calculated by:
      obtaining the values of the projective coordinates $T_1, T_2, T_3$ and the value of the further coordinate, $T_4$, initialized to $T_4 = aT_3^4$, where a is a first parameter of the elliptic curve;
      calculating intermediate variables:

$U = T_1^2$;

$V = T_2^2$;

$M = 3U + T_4$;

$W = V^2$; and $S = 2((T_1 + V)^2 - U - W)$;

calculating new values of $T_3$ and $T_4$:

$T_3 = 2T_2T_3$;

$T_4 = 16WT_4$, calculating new value of $T_1$:

$T_1 = M^2 - 2S$;

calculating new value of $T_2$:

$T_2 = M(S - T_1) - 8W$; and outputting at least the values of coordinates $T_1, T_2, T_3$.

7. A non-transitory medium storing a computer program that, when executed on a micro-processor, performs a cryptographic method for calculating a multiple of a point on an elliptic curve from the right to the left by repeated point doubling and point addition in an elliptic curve cryptosystem, the method comprising:
   evaluating each point doubling by the micro-processor by taking input a set of coordinates comprising projective coordinates $T_1, T_2, T_3$ and at least one further coordinate $T_4$;
   evaluating each point addition by the micro-processor by taking as input the projective coordinates $T_1, T_2, T_3$; and
   storing by the micro-processor the at least one further coordinate $T_4$ in a memory device for use in the next point doubling,
   wherein output coordinates of a point doubling is used as input coordinates for the next point doubling,
   wherein the point doubling is calculated by:
      obtaining the values of the projective coordinates $T_1, T_2, T_3$ and the value of the further coordinate, $T_4$, initialized to $T_4 = aT_3^4$, where a is a first parameter of the elliptic curve;
      calculating intermediate variables:

$U = T_1^2$;

$V = T_2^2$;

$M = 3U + T_4$;

$W = V^2$; and $S = 2((T_1 + V)^2 - U - W)$;

calculating new values of $T_3$ and $T_4$:

$T_3 = 2T_2T_3$;

$T_4 = 16WT_4$, calculating new value of $T_1$:

$T_1 = M^2 - 2S$;

calculating new value of $T_2$:

$T_2 = M(S - T_1) - 8W$; and outputting at least the values of coordinates $T_1, T_2, T_3$.

* * * * *